United States Patent [19]
Boothe

[11] 3,798,405
[45] Mar. 19, 1974

[54] AUTOMATED SPOT WELDING METHOD AND APPARATUS

[75] Inventor: Clyde O. Boothe, Rolling Hills Estates, Calif.

[73] Assignee: Farr Company, El Segundo, Calif.

[22] Filed: Aug. 23, 1972

[21] Appl. No.: 283,080

[52] U.S. Cl.............................. 219/56, 219/119
[51] Int. Cl............................................ B23k 11/00
[58] Field of Search .... 219/56, 119, 120, 86, 81–84

[56] References Cited
UNITED STATES PATENTS

| | | | |
|---|---|---|---|
| 3,050,614 | 8/1962 | Brown et al. | 219/56 |
| 2,929,916 | 3/1960 | Beagfeldt | 219/120 |
| 2,009,647 | 7/1935 | Brusse et al. | 219/86 |
| 2,130,657 | 9/1938 | Watkin | 219/86 |

Primary Examiner—J. V. Truhe
Attorney, Agent, or Firm—Lyon & Lyon

[57] ABSTRACT

In an automated spot welding machine for producing numerous welds, at least one first and one second electrode aligned and normally spaced apart are included with at least the first or second electrode being moveable during the welding of a workpiece positioned between the electrodes. The electrodes each include a welding surface with a designated area thereof adapted to contact the workpiece during the production of each weld thereon. Means associated with at least one of the electrodes are included to selectively provide new designated areas for contact with the workpiece thereby extending the useful life of the electrode.

36 Claims, 4 Drawing Figures

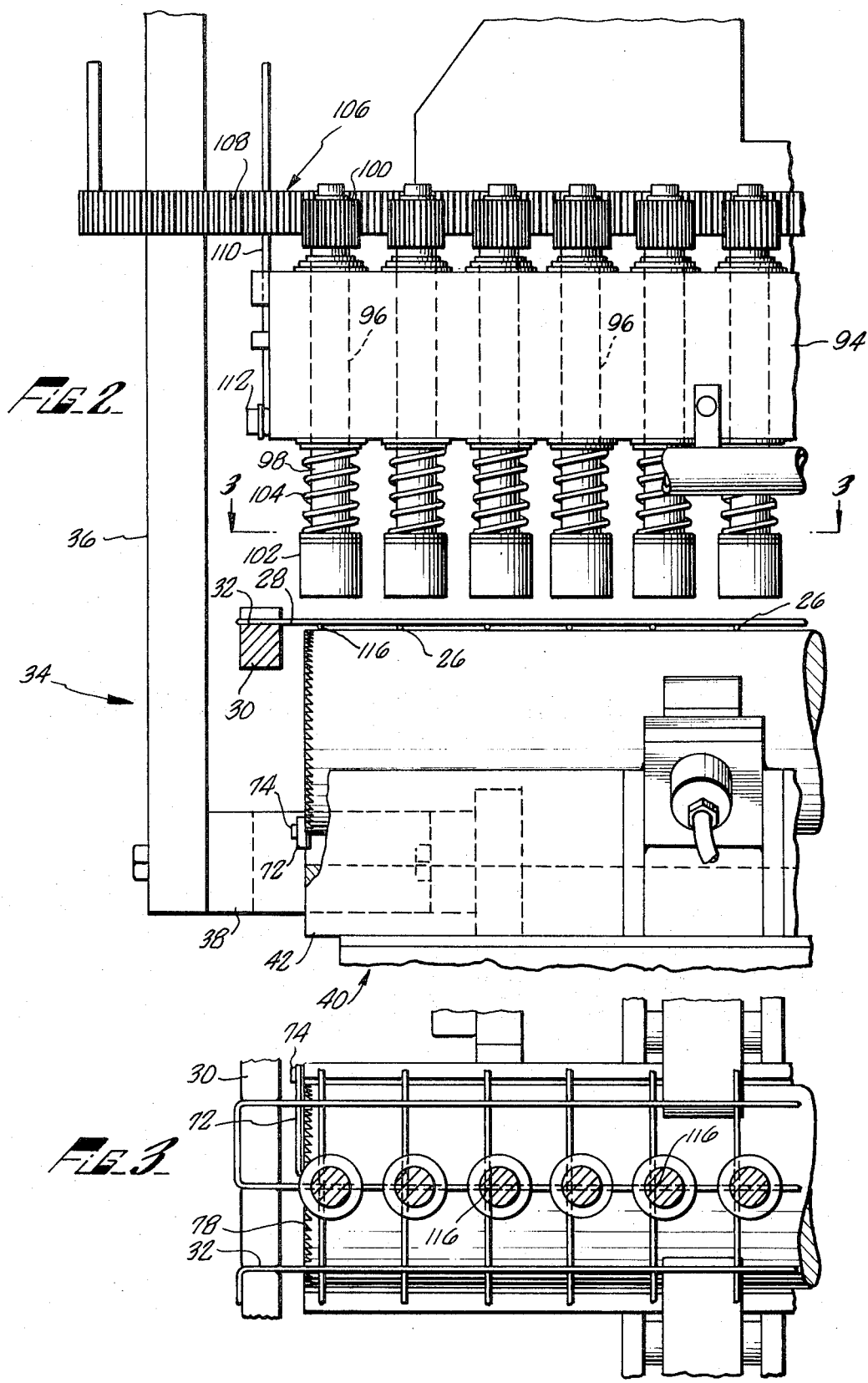

3,798,405

AUTOMATED SPOT WELDING METHOD AND APPARATUS

This invention relates to the art of welding and more particularly relates to a method and apparatus for automated spot welding with means for extending the useful life of electrodes employed therein.

In conventional automated spot welding machines one or more first electrodes are operably connected to one pole of a transformer through conductive means such as a bus bar, and one or more second electrodes normally spaced from the first electrode or electrodes and in alignment therewith are operably connected to the opposite pole of the transformer through other conductive means. Each electrode includes a welding surface. During welding, a workpiece comprising disconnected members is positioned between and adjacent to the welding surfaces of the spaced electrodes with the first electrode or electrodes located on one side of the workpiece and the second electrode or electrodes located on the other side thereof. At least the electrode or electrodes on one side of the workpiece are connected to the transformer through flexible conductive means such as a laminated shunt to permit movement towards the electrode or electrodes on the other side of the workpiece and during welding of the disconnected members of the workpiece a designated area of each welding surface of each electrode contacts the workpiece for forming a weld between the disconnected members as a result of the electrical resistance between the first and second electrodes.

These automated spot welding machines are typically used in assembly line manufacturing and operate continuously for long periods of time to spot weld at intervals a continuous workpiece or numerous separate workpieces. During each spot weld the electrode tip or designated area of each welding surface moves into contact with the workpiece and eventually wear and degradation of this area renders it inoperable whereupon the electrode must be removed and replaced or re-surfaced. During the replacement or resurfacing operation it is normally necessary to shut down the entire assembly line.

In certain automated spot welding machines this repair operation is particularly time consuming. For example, when the workpiece comprises a continuous wire mesh the disconnected members thereof consist of a number of spaced longitudinal wires and a number of spaced lateral or cross-wires. During production, the longitudinal wires are conveyed along a path that intersects the cross-wires with a weld being made at each intersection. Heretofore it has been conventional to use an automated spot welding machine with a first electrode at one side of each intersection and a second electrode at the other side thereof. It is common therefore for this type machine to include from 25 to 100 pairs of first and second electrodes, each of which must be eventually removed and replaced or resurfaced. The frequency of this repair operation for this type machine varies, but by a careful choice of electrode material and operating parameters it is possible to obtain upwards of 200,000 welds before surface renewal of the electrodes is required. However, even at this, under normal operating conditions it is generally necessary to re-surface or replace the electrodes about every 30 hours of continuous production. The time required for merely removing the electrodes is of course considerable because of the numerous electrodes in this type machine. Moreover, the particular positioning and arrangement of the electrodes in this machine for use in the production of wire mesh further complicates any removal and replacement of the electrodes.

Therefore, it is a primary object of the present invention to provide an improved method and apparatus for automated spot welding wherein the operational life of the electrodes employed therein is extended.

Another object of the present invention is to provide a method and apparatus for automated spot welding having means substantially simplifying and reducing the time required for the provision of renewed welding surface areas.

Still another object of the present invention is to provide an improved method and apparatus for use in the spot welding of a wire mesh.

In accordance with these and other objects, the present invention briefly comprises at least one first and one second electrode in an automated spot welding machine. The electrodes are aligned and normally spaced apart for the positioning of a workpiece therebetween. Each of the electrodes includes a welding surface with a designated area thereon for contact with the workpiece. Means provide for new welding surface areas on at least one of the electrodes without requiring removal or re-surfacing of the electrodes.

A still further object is to provide means to improve the efficiency of an automated spot welding operation.

Other objects and advantages of this invention will be made readily apparent from the following detailed description and the accompanying drawings, wherein:

FIG. 2 is a partial end view of the machine taken substantially on the lines 2—2 of FIG. 1 and illustrates the relative positioning of the electrodes and the workpiece;

FIG. 3 is a top view taken substantially on the lines 3—3 of FIG. 2 and further illustrates the relative positioning of the electrodes and the workpiece;

Figure 1:
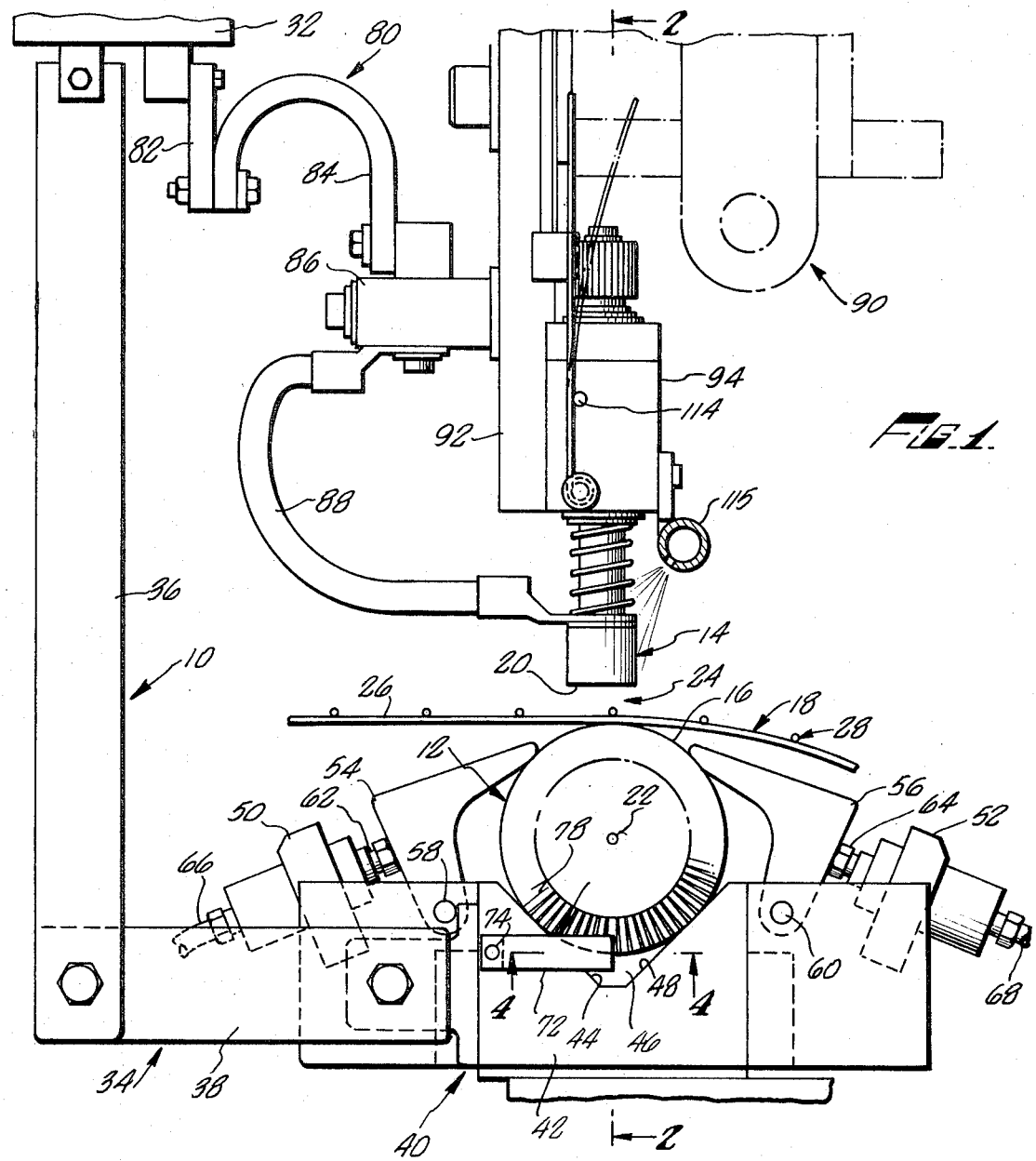
FIG. 1 is a partial side view of an automated spot welding machine for use in the production of wire mesh illustrating the means connecting and mounting the electrodes of the machine.

Referring now in detail to the drawings, FIGS. 1–3 illustrate the welding elements of an automated spot welding machine, generally designated 10. It will become apparent from the following description that this machine 10 is particularly adapted for use in the production of a continuous, relatively wide wire mesh. Although it is a purpose of the present invention to provide improved means for spot welding such a wire mesh, the present invention is not necessarily intended to be limited to this specific purpose.

The automated spot welding machine 10 as depicted in the drawings includes a lower electrode, generally designated 12, and a plurality of laterally spaced upper electrodes, generally designated 14, each of which is normally spaced apart from the lower electrode 12 and aligned therewith. The lower electrode 12 includes a cylindrical welding surface 16 which extends horizontally a distance substantially equal to the width of a workpiece, generally designated 18. The lower electrode 12 is preferably a 2 ½ inch diameter solid cylinder of berillium copper with the exterior surface thereof flash gold plated to prevent surface oxidation. Each upper electrode 14 extends vertically and includes at a lower end thereof a preferably flat circular welding surface 20. The upper electrodes 14 are also positioned in parallel alignment substantially across the length of the welding surface 16 with the flat welding surfaces 20 defining a plane which is parallel with the longitudinal axis 22 of the lower electrode 12 and above and adjacent to the welding surface 16.

The welding surfaces 20 of the upper electrodes 14 and the welding surface 16 of the lower electrode 12 define therebetween a path, generally designated 24, through which a plurality of parallel laterally spaced wires 26 are adapted to extend and across which one of a plurality of parallel and longitudinally spaced cross-wires 28 is adapted to extend. The plurality of wires 26 extending through the path 24 and the cross-wire 28 extending thereacross comprise the disconnected members of the workpiece 18 adapted to be welded together. During operation, the parallel wires 26 are fed continuously from a spool (not shown) through the path 24 and the cross-wires 28 are held on top of the wires 26 and in intersection therewith by rotating disc members 30 (only one of which is shown) adjacent each end of the electrode 12. The rotating disc members 30 each rotate about a horizontal axis and include peripheral laterally extending slots 32 in which the cross-wires 28 are placed. A feed mechanism (not shown) associated with the disc members 30 provide for a synchronized feed of the cross-wires 28 wherein one of the cross-wires 28 is rotated into position across the path 24 by the disc members during each welding operation.

A first conductive means comprising a rigid bus bar assembly, generally designated 34, electrically connects the lower electrode 12 to one pole of a welding transformer 32. The bus bar assembly 34 includes a pair of side arm conductors 36 (only one of which is shown) each of which extends downwardly from the welding transformer 32 past a side edge of the workpiece 18 to a conductive connector 38 attached to the lower end thereof. The conductive connector 38 extends horizontally inward from the end of the side arm conductor 36 underneath the workpiece to a mounting assembly, generally designated 40, which positions and secures the lower electrode 12.

The mounting assembly 40 includes a rigid and conductive copper saddle member 42 with a laterally and horizontally extending open trough 44 having downwardly and inclined sidewalls 46 and 48. The cylindrical lower electrode 12 rests within the trough 44 and is supported by the sidewalls 46 and 48. Remotely operable clamp members 50 and 52 having clamp arms 54 and 56 pivotally attached at 58 and 60, respectively, to the saddle member 42 on each side of the trough 44 hold the lower electrode 12 in the trough 44 firmly against the sidewalls 46 and 48 for an electrical connection therewith. Hydraulic activated plungers 62 and 64 act on the clamp arms 54 and 56, respectively, to control the pivotal movement thereof. Hydraulic lines 66 and 68 connect the plungers 62 and 64, respectively, to a conveniently located hydraulic cylinder or similar hydraulic mechanism (not shown) thereby providing for a conveniently remote operation of the clamp members.

Figure 4:
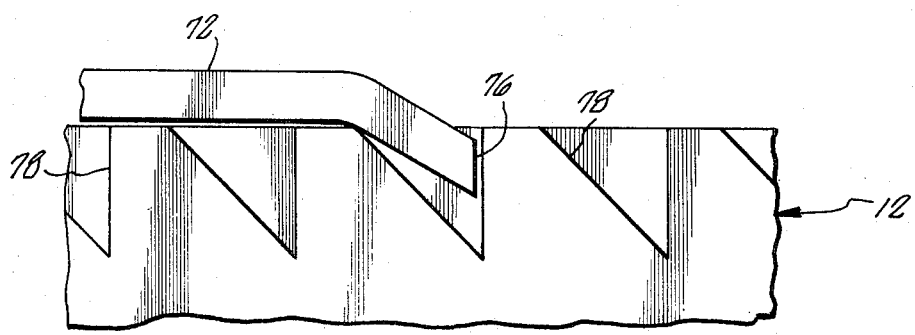
FIG. 4 is an enlarged fragmentary top view taken substantially on the lines 4—4 of FIG. 1 and illustrates means for indexing several designated contact areas on the welding surface of one of the electrodes.

For reasons here after set forth, after the machine 10 has operated a continuous member of hours the lower electrode 12 is turned a predetermined number of degrees counterclockwise about its longitudinal axis 22 while remaining within the trough 44. To permit this movement of the lower electrode 12, the pressure applied by the plungers 62 and 64 through the clamp arms 54 and 56 is released. Movement of the electrode 12 is controlled by indexing means, generally designated 70, comprising an indexing pawl 72 pivotally mounted at 74 to one end of the saddle member 42. As seen best in FIG. 4, one end 76 of the indexing pawl 72 is bent inwardly to normally extend into one of a plurality of radially extending, circumferentially spaced indentations 78 on the end of the lower electrode 12. Biasing means (not shown) normally maintain the end 76 of the pivotally mounted pawl 72 in its inwardly extending position. At the other end of the trough 44, means (not shown) rigidly affixed to the saddle member 42 abut the other end of the lower electrode 12 to prevent axial movement thereof.

A second conductive means, generally designated 80, electrically connects each upper electrode 14 to the other opposite pole of the welding transformer 32. The second conductive means 80 includes a rigid conductive connector 82 which extends downwardly from the transformer 32. A flexible laminated shunt 84 is connected at one end to the lower end of the conductive connector 82 and connected at the other end to an upper bus member 86. A plurality of separate flexible shunts 88 individually connect each of the electrodes 14 to the bus member 86.

The upper electrodes 14 are each individually mounted for vertical axial movement in a mechanical slide assembly, generally designated 90. The slide assembly 90 includes a vertical support member 92 which reciprocates during each welding operation. The upper bus member 86 and a horizontally extending lateral support member 94 are rigidly secured to the vertical support member 92 and are adapted to move therewith.

The lateral support includes a plurality of tubular openings, as indicated by the phantom lines 96, with cylindrical, axially extending shaft sections 98 of the upper electrodes 14 being coaxially mounted therein for limited axial movement of the electrodes 14. The upper and lower ends of each electrode 14 extend beyond the tubular openings 96 and are provided with enlarged axially extending cylindrical sections 100 and 102, respectively, which limit the axial movement of the electrodes 14 within the tubular openings 96. Spring members 104 mounted co-axially about the shaft sections 98 of each electrode 14 between the lateral support member 94 and the lower enlarged ends 102 act on the electrodes 14 to insure proper contact by each welding surface 20 with the workpiece during a welding operation.

The upper electrodes 14 are also adapted to rotate within the tubular openings 96 about their vertical axes for reasons to be made apparent by a following discussion. Rotational movement of the upper electrodes 14 is controlled by second indexing means, generally designated 106. The second indexing means includes a horizontally moveable rack 108 having teeth thereon cooperating with the upper enlarged ends 100 which are each preferably in the form of a non-conductive spur gear. A resilient lock arm 110 fixably secured at one end 112 to the lateral support member 94 normally mates with the rack 108 to prevent movement thereof but is bendable about a pin 114 on the lateral support member 94 for disengagement with the rack 108.

Extending laterally above the path 24 and connected to the member 94 is a perforated tube 115 adapted to blow cooling air onto the upper electrodes 14. Typically, it is necessary to use a more sophisticated re-circulating water system for cooling the electrodes in an automated spot welding machine, but because of the relatively large heat sink provided by the single lower electrode 12, air cooling has been found to be adequate.

During a welding operation the upper electrodes 14 are moved downwardly by the slide assembly 90 towards the lower electrode 12 to close the space therebetween and thereby cause contact between the workpiece at each intersection of the disconnected members and a designated welding surface area on each of the electrodes. The welding surface areas of the upper electrodes 14 contact the wire 28 extending laterally across the path 24 at each intersection 116 between the wire 28 and the wires 26 and the welding surface area of the lower electrode 12 contacts each of the wires 26 extending through the path 24 at each intersection of wires. Proper contact with the workpiece 18 is insured by the force of the springs 104 acting on the upper electrodes 14. As a result of the electrical resistance between the upper electrodes 14 and the lower electrode 12 a weld is created at each wire intersection 116.

An important feature of the present invention resides in the positioning of the designated welding surface area aligned for contact with the workpiece with respect to the axis about which the welding surface is rotatable. With regard to the lower electrode 12, the cylindrical welding surface 16 is rotatable about the axis 22 and a plurality of longitudinally extending welding surface areas are circumferentially spaced about the surface 16 and are thus radially off-set from the axis 22. During a welding operation, a surface area designated for contact with the wires 26 is aligned with the wire intersections 116 in the path 24 which are located along a line in vertical parallel alignment with the axis 22. As a result of this particular arrangement, a new designated welding surface area can be provided for the lower electrode 12 after the surface area aligned for contact has become inoperable by merely rotating the lower electrode 12 and thus the welding surface 16 a few degrees about the axis 22. This rotation displaces the previously designated welding surface area from the line of intersections 116 and moves a new welding surface area into alignment therewith. Desired rotation of the lower electrode 12 to provide a new designated welding surface area thereon is accomplished by the means and manner herein before described wherein the applied clamping force of the clamp members 50 and 52 is released and the lower electrode 12 is rotated counter-clockwise until the end 76 of the pawl 72 moves from one indentation 78 to the next successive indentation 78. The indentations 78 are preferably spaced to provide a new welding surface area with every 6° rotation of the lower electrode 12. Thus, sixty separate designated welding surface areas are provided on the welding surface of the lower electrode.

With regard to the upper electrodes 14, each circular welding surface 20 is rotatable about a vertically extending center axis and a plurality of welding surface areas are spaced about this axis and off-set therefrom.

During a welding operation, a surface area of each upper electrode 14 designated for contact with the wire 28 is aligned with one of the wire intersections 116 in the path 24. New designated welding surface areas for the electrodes 14 are provided by merely rotating the upper electrodes 14. Desired rotation is achieved by disengaging the lock arm 110 from the rack 108, moving the rack a distance equal to the distance between the teeth on the rack to turn the spur gears which in turn rotates the welding surfaces 20 about their center axis. This moves the previous designated welding surface areas out of alignment with the intersections 116. Preferably, each spur gear includes thirteen teeth thereby providing thirteen separate designated welding surface areas on the welding surfaces 20 of each upper electrode 14.

As indicated previously up to 200,000 welds is possible for each weld contact area. Therefore, the upper electrodes 14 are expected to provide approximately 2.6 million welds or an operating life of approximately 400 hours before actual removal of the upper electrodes is required for re-surfacing. It is expected that the lower electrode 12 will provide approximately 12 million welds or an operating life of approximately 1800 hours before removal and re-surfacing of the electrode is required Since the provision of a new welding surface area for each electrode about every 200,000 welds requires only a matter of minutes, the time of the actual shut-down of the welding operation at these intervals is substantially less than previously required when using the heretofore conventional methods and machines for automated spot welding.

From the above, it is readily apparent that the present invention provides a new and improved method and apparatus for the automated spot welding of cross-wire mesh. However, it is felt that the present invention is equally applicable to other automated spot welding operations wherein employment of an electrode having several separate welding surface areas each off-set from a center axis of rotation of the welding surface and each being adapted to move into a position for contact with a workpiece by merely rotating the electrode thereby providing for an improved spot welding operation.

Having fully described my invention, it is to be understood that I do not wish to be limited to the details herein set forth, but my invention is of the full scope of the appended claims.

I claim:

1. An apparatus for automated spot welding, comprising:
   at least one first and one second electrode means defining therebetween a space wherein a work-piece is adapted to be located for welding;
   a moveable welding surface on at least one of said electrode means including welding surface areas, any one of which is adapted to be selectively aligned for contact with the workpiece by movement of said welding surface; and
   a path traversed by said welding surface areas during movement of said welding surface, said path being located outside any plane in which the line between the workpiece and a said surface area aligned for contact therewith is located.

2. The apparatus of claim 1, wherein each of said electrode means includes a moveable welding surface and each said welding surface includes welding surface areas, any one of which is adapted to be selectively aligned for contact with the workpiece by movement of said welding surface.

3. The apparatus of claim 1, wherein said moveable welding surface includes a fixed axis about which said welding surface areas are positioned and offset from and about which said welding surface moves rotationally.

4. The apparatus of claim 3, wherein said welding surface areas on said welding surface are positioned equidistant from the fixed axis thereof.

5. An apparatus for automated spot welding, comprising:
- at least one first and one second electrode defining therebetween a space wherein a workpiece is adapted to be located for welding, each said electrode having a rotatable welding surface with separate welding surface areas thereon, any one of which is adapted to be selectively aligned for contact with the workpiece by rotation of said welding surface, and a fixed axis about which said surface areas are positioned and offset from and about which said welding surface rotates; and
- a path traversed by said welding surface areas on at least one of said welding surfaces during rotation of said one welding surface, said path being located outside any plane in which the line between the workpiece and a said surface area aligned for contact therewith is located.

6. The apparatus of claim 5, wherein said other welding surface comprises a cylindrical surface.

7. The apparatus of claim 6, wherein said cylindrical surface rotates about a longitudinal axis extending in a direction perpendicular to the direction of the line between the workpiece and a said surface area aligned for contact therewith.

8. The apparatus of claim 5, wherein said one welding surface rotates about an axis parallel to the line between the workpiece and a said surface area aligned for contact therewith.

9. The apparatus of claim 8, wherein said one welding surface is in a plane perpendicular to the plane in which the line between the workpiece and a said surface area aligned for contact therewith is located.

10. The apparatus of claim 5, wherein said axes of said first and said second electrodes extend in a non-parallel direction.

11. An automated spot welding apparatus for use in the production of a wire mesh, comprising:
- a plurality of first rotatably mounted electrodes and a second rotatably mounted electrode spaced therefrom;
- a welding path between said first and second electrodes through which a plurality of first wires extend and across which a second wire extends intersecting each of said first wires;
- each said first electrode including a flat welding surface extending in a plane parallel to said welding path, each said flat welding surface being rotatable about an axis perpendicular to said welding path and including a plurality of contact areas off-set from said axis;
- said second electrode including a cylindrical welding surface extending the length of said welding path, said cylindrical welding surface being rotatable about a center axis parallel to said welding path and including a plurality of contact areas radially off-set from said center axis and circumferentially spaced about said surface;
- means for selectively aligning one said contact areas of each said first electrode and one of said contact areas of said second electrode; and
- said first electrodes each being moveable towards said welding path for causing said aligned contact areas of said electrodes to contact the first and second wires at the intersection thereof.

12. The apparatus of claim 11, wherein said second electrode comprises a solid cylinder and a support member having an open trough rotatably supports said cylinder.

13. The apparatus of claim 12, wherein clamp members connected to said support member hold said cylinder in a fixed position within said trough.

14. The apparatus of claim 13, wherein hydraulic means are provided for the remote operation of said clamp members.

15. The apparatus of claim 12, wherein said support member comprises an electrical conductor.

16. The apparatus of claim 12, wherein said selective alignment means includes an indexing pawl connected to said support member with one end thereof adapted to register with aperatures on one end of said cylinder, each said aperature being aligned with one of said contact areas on said cylindrical welding surface.

17. The apparatus of claim 11, wherein said second electrode comprises a berrilium-copper cylinder which is flash gold plated to prevent surface oxidation.

18. The apparatus of claim 11, wherein said cylindrical welding surface includes 60 separate contact areas, each spaced apart an angular distance of 6°.

19. The apparatus of claim 11, wherein said first electrodes are mounted axially within a reciprocating support member with one end of each said first electrode extending beyond said support and comprising said welding surface.

20. The apparatus of claim 19, wherein each said first electrode is mounted in said support member for individual axial movement and biasing means between said welding surface end and said support member act on said welding surface during contact with a wire.

21. The apparatus of claim 19, wherein said selective alignment means includes a rack member and gear members on the other ends of said first electrodes which cooperate with said rack member.

22. The apparatus of claim 11, wherein said welding surface of each said first electrode comprises a flat circular surface with 13 separate contact areas.

23. An apparatus for automated spot welding, comprising:
- at least one first rotatably mounted electrode and one second rotatably mounted electrode, each having thereon a welding surface and defining therebetween a space wherein a workpiece is adapted to be located for welding;
- a plurality of welding surface areas located in one first plane on said welding surface of said second electrode, any one of which is adapted to be selectively aligned for contact with the workpiece by rotation of said second electrode;
- a plurality of welding surface areas located on said welding surface of said first electrode, any one of which is adapted to be selectively aligned both for contact with the workpiece and with a welding surface area on said welding surface of said second electrode aligned for contact with the workpiece by rotation of said first electrode; and a path through which each said welding surface area on said welding surface of said first electrode moves during selective alignment thereof for contact with the workpiece which at least in part lies outside said first plane.

24. The apparatus of claim 23, wherein said second electrode is rotatable about a fixed axis perpendicular to said first plane and said first electrode is rotatable about a fixed axis non-perpendicular to said first plane.

25. The apparatus of claim 23, wherein a plurality of sets of plural welding surface areas on said welding surface of said second electrode are provided with said welding surface areas on each said set located in a separate plane and a plurality of first electrodes are provided, each having a welding surface with the welding surface areas thereon each adapted to be selectively aligned both for contact with the workpiece and with a said welding surface area of said second electrode in one of said planes.

26. The apparatus of claim 25, wherein said welding surface of said second electrode is cylindrical and said welding surface areas located in each said plane are circumferentially spaced thereon.

27. The apparatus of claim 26, wherein indexing means are provided to control the angular distance in which said cylindrical welding surface rotates during the selection of a said separate area for contact with the workpiece.

28. The apparatus of claim 26, wherein remotely controllable clamp means are provided for clamping said second electrode in a fixed position thereby maintaining said selected separate areas in alignment with said selected areas of said first electrodes.

29. An automated spot welding method, wherein the step comprise:

fixably aligning one of several contact areas on the welding surface of at least one first moveably mounted electrode on one side of a welding path with a fixed designated area of the welding surface of a second electrode on the other side of the welding path; and replacing the aligned one contact area with another contact area on the welding surface on the first moveably mounted electrode by moving the first electrode to cover the other contact area to traverse a predetermined path at least a portion of which is located outside any plane in which a line normal to the fixed designated area is located.

30. The method of claim 29, wherein the first electrode is moved about a fixed axis and the path traversed by the other contact area is offset from that axis.

31. The method of claim 30, wherein the other contact area is traversed through a path which defines at least a segment of a circle.

32. An automated spot welding method, wherein the steps comprise:

fixably aligning a designated area of each one of several groups of areas each located in a single separate plane on the welding surface of a second electrode on one side of a welding path for contact with a workpece;

fixably aligning one of several contact areas on the welding surface of each of a plurality of first electrodes on the other side of the welding path with a respective designated area and for contact with the workpiece; and replacing each one aligned contact area with another contact area on the same welding surface thereof by rotating each first electrode and the welding surface thereof about a fixed axis to move the other contact along a predetermined path at least a part of which is located outside the plane in which the respective designated area is located.

33. The method of claim 32, wherein the designated area of each group of areas is replaced by another area of the same group by rotating the second electrode and the welding surface thereof about a fixed axis.

34. The method of claim 33, wherein said first electrodes and the welding surfaces thereof and the second electrode and the welding surfaces thereof are each rotated a predetermined angular distance during replacement of the areas.

35. The method of claim 32, wherein replacement of the areas is delayed until after a number of welds.

36. An automated spot welding method for the production of a wire mesh, wherein the steps comprise:

passing a plurality of spaced first wires longitudinally through a welding path between a plurality of individual first electrodes on one side thereof and a second electrode on the other side thereof;

positioning during each welding operation a second wire laterally across said welding path in intersection with each of said first wires and between said first electrodes and said second electrode;

aligning a designated one of several contact areas on the welding surface of each said first electrode with an intersection of said wires; and replacing at least one of said designated contact areas with another contact area on the same welding surface by rotating welding surface to move the other contact area through a path which at least in part is located outside any plane in which the line between the intersection and the designated contact area is located.

* * * * *